United States Patent
Dilisio et al.

(10) Patent No.: US 9,522,577 B2
(45) Date of Patent: Dec. 20, 2016

(54) DYNAMIC TIRE AIR PRESSURE SYSTEM

(71) Applicants: Hyundai America Technical Center, Inc., Superior Township, MI (US); Hyundai Motor Company, Seoul (KR); Kia Motors Corporation, Seoul (KR)

(72) Inventors: Angelo Dilisio, Ann Arbor, MD (US); Joel Myers, Southgate, MI (US); Todd Nelson, Brighton, MI (US); Daniel Kim, Irvine, CA (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/462,667

(22) Filed: Aug. 19, 2014

(65) Prior Publication Data

US 2016/0052351 A1    Feb. 25, 2016

(51) Int. Cl.
*G06F 7/00* (2006.01)
*B60C 23/00* (2006.01)
*B60C 23/16* (2006.01)

(52) U.S. Cl.
CPC ........... *B60C 23/003* (2013.01); *B60C 23/002* (2013.01); *B60C 23/16* (2013.01)

(58) Field of Classification Search
USPC ..... 701/36; 152/419, 46, 415; 137/14, 2, 12; 60/602; 700/279, 275
See application file for complete search history.

(56) References Cited

U.S. PATENT DOCUMENTS

| | | | | |
|---|---|---|---|---|
| 4,742,857 A | * | 5/1988 | Gandhi | B60C 23/004 137/225 |
| 5,587,698 A | * | 12/1996 | Genna | B60C 23/0493 116/34 R |
| 5,928,444 A | * | 7/1999 | Loewe | B60C 23/004 152/418 |
| 5,975,174 A | * | 11/1999 | Loewe | B60C 23/12 152/415 |
| 6,518,877 B1 | * | 2/2003 | Starkey | B60C 23/004 340/447 |
| 6,691,754 B1 | * | 2/2004 | Moore | B60C 23/12 152/415 |
| 6,976,391 B2 | * | 12/2005 | Maquaire | B60C 23/004 73/146 |

(Continued)

FOREIGN PATENT DOCUMENTS

| | | |
|---|---|---|
| JP | 2005-313738 A | 11/2005 |
| JP | 2007-331664 A | 12/2007 |

(Continued)

*Primary Examiner* — Ronnie Mancho
(74) *Attorney, Agent, or Firm* — Mintz Levin Cohn Ferris Glovsky and Popeo, P.C.; Peter F. Corless

(57) ABSTRACT

In one embodiment, a dynamic tire air pressure system for a vehicle is disclosed. The system includes a tire pressure sensor that measures an air pressure of a tire. The system also includes a first reservoir tank maintaining a lower air pressure than the measured air pressure of the tire. The system further includes a second reservoir tank maintaining a higher air pressure than the measured air pressure of the tire. The system additionally includes one or more valves that control deflation and inflation of the tire by selectively coupling the tire to the first or second reservoir tanks.

19 Claims, 11 Drawing Sheets

(56) References Cited

U.S. PATENT DOCUMENTS

| | | | |
|---|---|---|---|
| 7,032,443 B2* | 4/2006 | Moser | B60C 23/043 |
| | | | 73/146.5 |
| 7,051,585 B2* | 5/2006 | Claussen | B60C 23/003 |
| | | | 152/418 |
| 7,161,476 B2* | 1/2007 | Hardman | B60C 23/0433 |
| | | | 340/10.33 |
| 7,690,411 B2* | 4/2010 | Wilson | B60C 23/0408 |
| | | | 152/415 |
| 8,955,566 B2* | 2/2015 | Loewe | B60C 23/004 |
| | | | 152/418 |
| 2003/0040843 A1* | 2/2003 | Forti | G01L 17/00 |
| | | | 700/279 |
| 2011/0203710 A1* | 8/2011 | Hinojosa, Jr. | B60C 23/10 |
| | | | 152/419 |
| 2015/0174972 A1* | 6/2015 | Zhou | B60C 23/003 |
| | | | 340/447 |

FOREIGN PATENT DOCUMENTS

| | | |
|---|---|---|
| JP | 2010-276497 A | 12/2010 |
| KR | 10-2000-0018862 | 4/2002 |
| KR | 10-0868318 B1 | 11/2008 |
| KR | 102011-0035109 A | 4/2011 |
| WO | 2013/114388 A1 | 8/2013 |

* cited by examiner

DYNAMIC TIRE AIR PRESSURE SYSTEM

BACKGROUND (a) Technical Field

The present disclosure generally relates to a dynamic air tire pressure system. In particular, systems and methods are disclosed herein that dynamically adjust the pressure of a tire based on a determined state of the vehicle.

(b) Background Art

Tire pressure in a vehicle can affect a number of different aspects of the operation of a vehicle. First, uneven tire pressures in a vehicle can lead to uneven and premature wear of the vehicle's tires. Second, the ride experienced by the passengers of the vehicle is often affected by tire pressure. For example, a lower tire pressure increases the "footprint" of the vehicle, which may be desirable when traversing certain types of terrain, allowing the vehicle to better "grip" the terrain. Third, the fuel economy of the vehicle may be impacted by the vehicle's tire pressure, since the amount of friction between the vehicle's tires and the road is a function of the vehicle's tire pressure.

Because of the various effects that the tire pressure of a vehicle can have on the vehicle, many automotive manufacturers specify suggested tire pressures. Vehicle owners are then encouraged to periodically measure their tire pressures and to adjust the pressures, if necessary (e.g., by using an air compressor at a gas station). To ensure that vehicle owners comply with these recommendations, some modern vehicles are equipped with tire pressure sensor systems that monitor the pressure of the vehicle's tires. If the tire pressure is outside of the manufacturer's recommended range, the system may alert the driver by illuminating a dashboard light. In some cases, a vehicle may even be equipped with an air compressor that automatically adjusts the vehicle's tire pressure to the manufacturer's recommended pressure range. However, such systems typically take a blind approach to adjusting a vehicle's tire pressures and fail to account for varying factors other than the vehicle's current tire pressures.

In order to solve the problems in the related art, there is a demand for the development of a tire air pressure system that dynamically adjusts the individual tire pressures of a vehicle according to a detected state of the vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides systems and methods for dynamically adjusting the air pressure of different tires of a vehicle. In particular, a tire air pressure system for a vehicle is disclosed that may dynamically control the pressure of each tire individually according to the current state of the vehicle.

In one embodiment, a dynamic tire air pressure system for a vehicle is disclosed. The system includes a tire pressure sensor that measures an air pressure of a tire. The system also includes a first reservoir tank maintaining a lower air pressure than the measured air pressure of the tire. The system further includes a second reservoir tank maintaining a higher air pressure than the measured air pressure of the tire. The system additionally includes one or more valves that control deflation and inflation of the tire by selectively coupling the tire to the first or second reservoir tanks. In some embodiments, the system may include an air compressor coupled to the first and second reservoir tanks and to the one or more valves to supply pressure to the reservoir tanks.

According to various aspects, a tire air pressure system may individually adjust the tire pressures based on various conditions. In one aspect, the system may adjust the vehicle's tire pressures to a nominal setpoint after startup of the vehicle. In yet another aspect, the system may detect acceleration of the vehicle in a direction substantially perpendicular to the surface of the ground and, in response, adjust the vehicle's tire pressures.

The amount of pressure adjustment provided to a tire by the system (e.g., by inflating or deflating the tire) may, in one embodiment, be a function of a selected user mode. Such modes may include a sport mode (e.g., to increase handling of the vehicle), a comfort mode (e.g., to improve the ride of the vehicle), and/or a fuel economy mode (e.g., to increase the fuel economy of the vehicle).

In another embodiment, a method of dynamically controlling tire air pressure in a vehicle is disclosed. An air pressure measurement is received at a processor from a tire pressure sensor. The internal pressure of a first reservoir tank is increased to be higher than the measured pressure of the tire. The internal pressure of a second reservoir tank is decreased to be lower than the measured pressure of the tire. One or more valves are then actuated to either deflate the tire by connecting the second reservoir tank to the tire or inflate the tire by connecting the first reservoir tank to the tire.

In a further embodiment, a dynamic tire air pressure system for a vehicle is disclosed. The system includes means for measuring an air pressure of a tire. The system also includes means for selectively inflating the tire and means for selectively deflating the tire. The system additionally includes means for controlling the inflating and deflating of the tire based on the measured air pressure of the tire and on a state of the vehicle.

Advantageously, the systems and methods described herein provide for the dynamic adjustment of individual tires of a vehicle according to a detected state of the vehicle.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
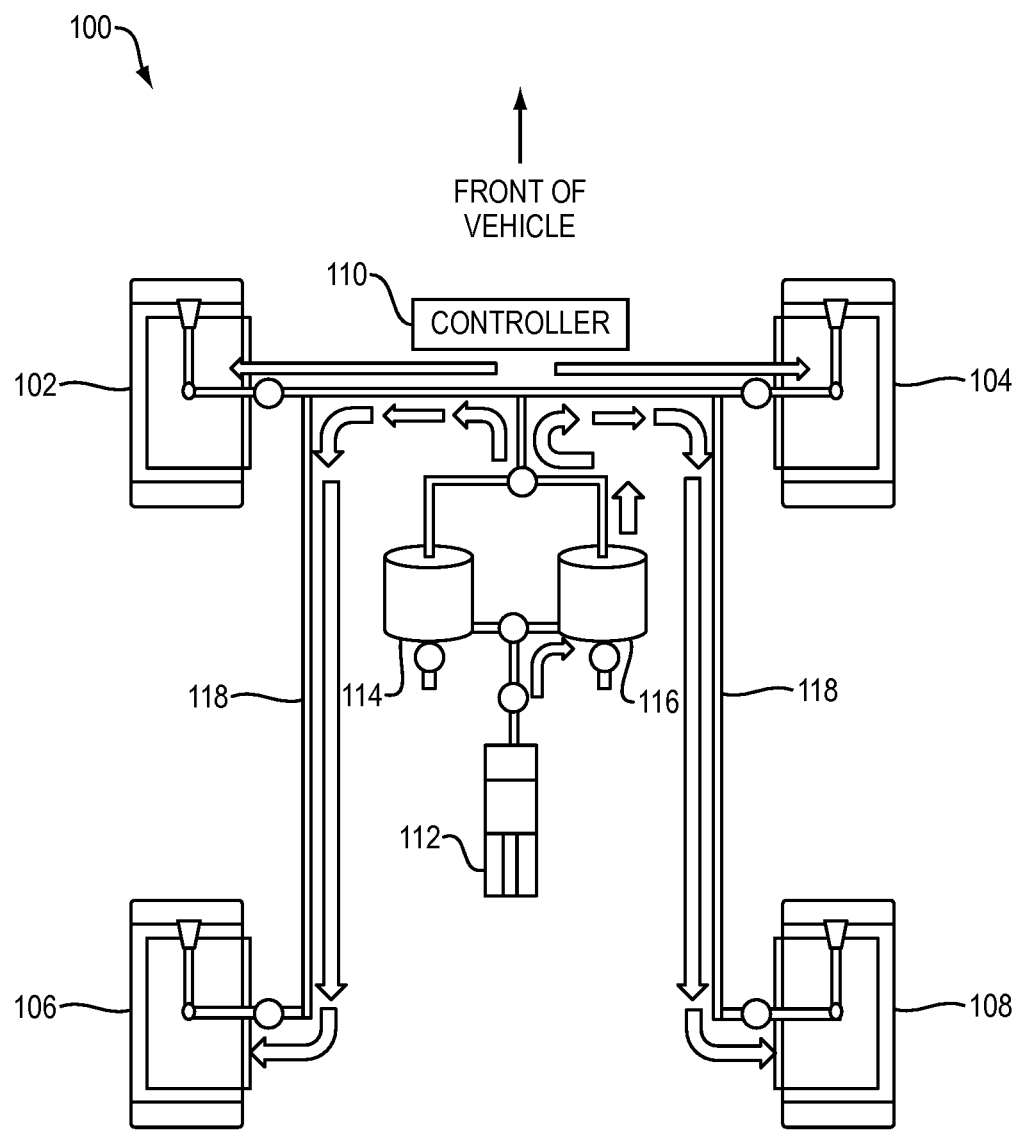
FIG. 1 is a diagram illustrating an example dynamic tire air pressure system (D-TAPS)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present disclosure will be described so as to be easily embodied by those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a dynamic tire air pressure system (D-TAPS) that adjusts the pressure of a vehicle's tire according to the current pressure of the tire and a detected state of the vehicle. Vehicle states may include, but are not limited to, a startup state (e.g., immediately after the vehicle is started), a cornering state (e.g., the vehicle is turning left or right), a braking state (e.g., when the vehicle's antilock braking system has activated), a lowered fuel economy state (e.g., the fuel economy of the vehicle is below a threshold value), or a state that corresponds to the terrain over which the vehicle is traveling (e.g., the vehicle is "bouncing" due to the terrain). In some embodiments, the setpoint tire pressure for the various vehicle states may further be controlled by a user mode, such as a sport mode, a comfort mode, a fuel economy mode, etc.

Referring now to FIG. 1, an example dynamic tire air pressure system (D-TAPS) 100 is shown, according to various embodiments. As shown, a vehicle may have a number of tires 102-108 that support the vehicle and provide traction to propel the vehicle along the ground. Each of tires 102-108 are inflatable tires that retain internal gas pressures that are greater than the atmospheric pressure external to tires 102-108. Tires 102-108 may be constructed of any suitable material such as vulcanized rubber or the like. The internal pressures of tires 102-108 are regulated by D-TAPS 100 which dynamically inflates or deflates tires 102-108 according to a detected state of the vehicle and the current internal pressures of tires 102-108. As will be appreciated by one skilled in the art, tires 102-108 are exemplary only and that a vehicle may include any number of tires. Additionally, one skilled in the art will appreciated that D-TAPS 100 may be adapted to provide pressure control over any number of tires of a vehicle.

D-TAPS 100 may include one or more air compressors 112 that provide pressurized gas within D-TAPS 100. Such pressurized gas may be provided via lines 118 to tires 102-108. In some cases, air compressor 112 includes a nitrogen filter that reduces permeation and extends tire life. D-TAPS 100 may also include two tanks 114, 116 (e.g., accumulators) that can store pressurized gas received from compressor 112 or relieve pressure from any of tires 102-108. Thus, when relieving pressure from tires 102-108, tanks 114, 116 allow for the rapid decompression of tires 102-108, such as during an emergency braking condition or other traction loss scenario. In one embodiment, tanks 114, 116 are omitted and tires 102-108 may be inflated or deflated directly by air compressor 112. Air relieved from any of tires 102-108 may be vented by D-TAPS 100 into the atmosphere or may be reclaimed by D-TAPS 100, in various embodiments. While two tanks 114, 116 are shown, any number of tanks may be used in alternate embodiments (e.g., one tank, three tanks, etc.). D-TAPS 100 also includes a controller 110 that provides computerized control over D-TAPS 100. For example, controller 110 may determine and control whether any of tires 102-108 are inflated or deflated by D-TAPS 100.

Figure 2:
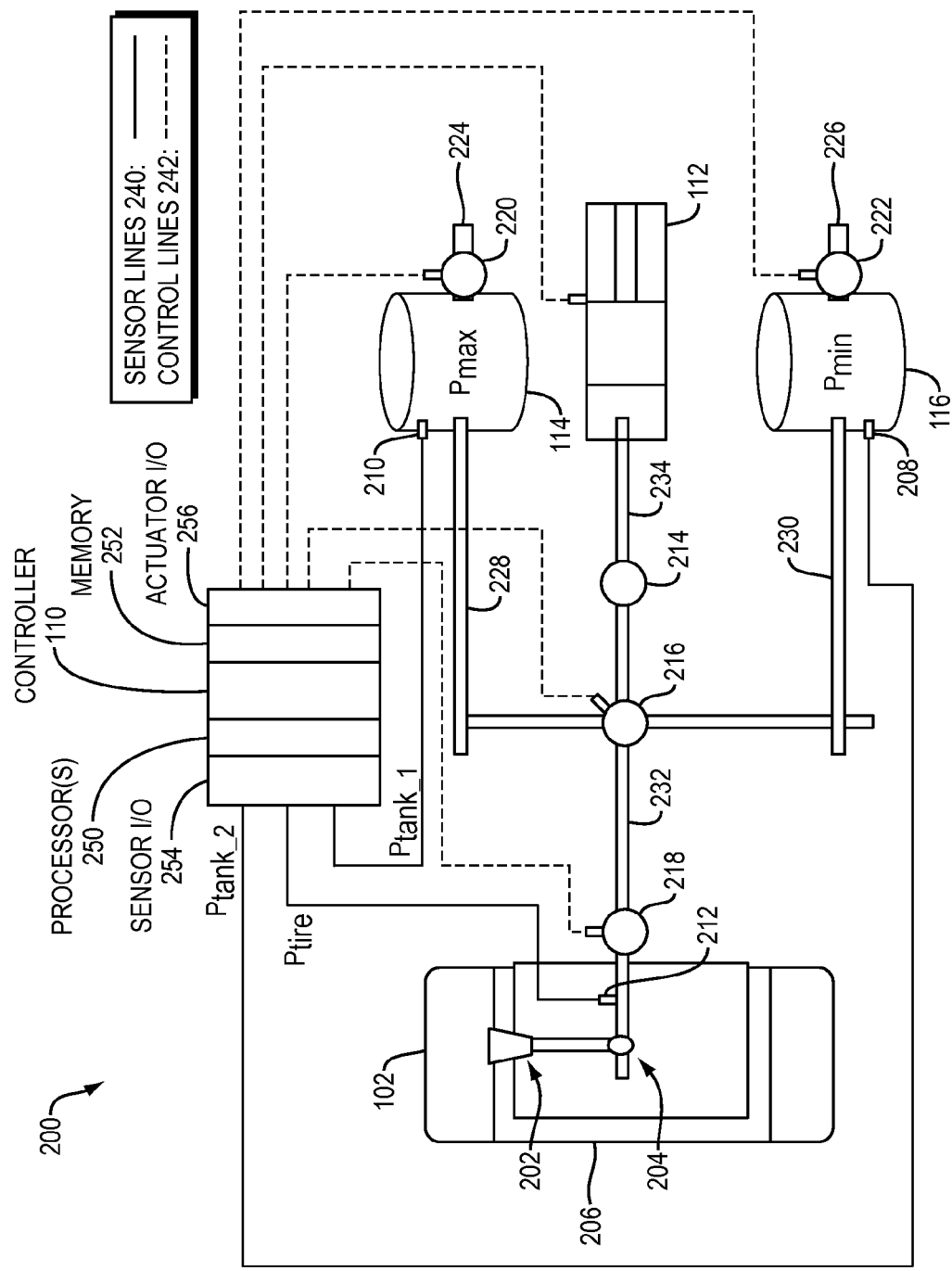
FIG. 2 is an illustration of an example control system for a D-TAPS.

An illustration of an example control system 200 for a D-TAPS is shown in FIG. 2, according to various embodiments. At the core of control system 200 is a controller, such as the controller 110 shown in FIG. 1. Controller 110 includes one or more processors 250 and one or more memory devices that comprise a memory 252. Stored within memory 252 are instructions (e.g., firmware, software, etc.) that are executed by processors 250, thereby causing controller 110 to perform operations. Controller 110 also includes one or more interfaces that receive input data (e.g., sensor data, data from another controller, etc.) and/or provide control signals over other components of the D-TAPS. For example, controller 110 may include input and output (I/O) interfaces 254, 256 that receive sensor inputs via sensor lines 240 and provide actuator control signals via control lines 242.

Control system 200 and, more generally, the D-TAPS may include any number of sensors that monitor the D-TAPS. For example, as shown, controller 110 may receive a first tank pressure measurement ($P_{tank\_1}$) from a pressure sensor 210 located at tank 114, a second tank pressure measurement ($P_{tank\_2}$) from a pressure sensor 208 located at tank 116, and/or a tire pressure measurement ($P_{tire}$) from a pressure sensor 212 located at tire 102. According to various embodiments, other data (not shown) that may be received by controller 110 include acceleration or deceleration data (e.g., from an accelerometer of an electronic stability control system), an indication of a direction of acceleration (e.g., forward, sideways, up or down, etc.), a steering wheel angle measurement, braking information (e.g., upon activation of an antilock braking system), a vehicle speed sensor, etc. Further input data that may be received by controller 110 and used to control the D-TAPS may include information regarding external conditions of the vehicle, such as traffic conditions (e.g., upcoming stopped traffic, etc.), weather or forecast data (e.g., temperature, humidity, precipitation, etc.), navigation data (e.g., to predict corners, changing elevation grades, etc.), recent events that have been learned or stored, forward collision data (e.g., from an active safety system), etc. In one embodiment, controller 110 may also receive user input regarding a user mode (e.g., sport mode, comfort mode, fuel economy mode, etc.).

Controller 110 may control the D-TAPS based on its received data by actuating any number of valves in the D-TAPS. As shown, for example, controller 110 may provide control over an actuator of a switch valve 216 that selectively controls the flow of gas to and from tanks 114, 116. For example, controller 110 may actuate switch valve 216 to select which of tanks 114, 116 receives pressurized gas from air compressor 112 via lines 234, 228, and 230. A one way flow valve 214 may be coupled to the output of compressor 112 to prevent pressure backup.

In some embodiments, tanks 114, 116 may include valves 220, 222 that are controlled by controller 110 to open or close atmospheric vents 224, 226. For example, controller 110 may reduce the pressure in tank 114 by opening valve 220 to release stored gas in tank 114 into the atmosphere. In other embodiments, excess gas may be provided back to compressor 112, to reuse the gas within the D-TAPS.

Gas is provided to/from tire 102 via a line 232 which includes a valve 218 that is actuated by controller 110. The gas may flow to/from tire 102 and line 232 via a coupling 204 and a valve stem 202 and into the space between tire 102 and rim 206. Coupling 204 may be a rotational coupling that allows the connector tubing to rotate with tire 102. Additionally, valve stem 202 may be a rapid decompression valve stem that allows tire 102 to be rapidly deflated, such as during a braking condition (e.g., emergency braking, activation of the antilock brake system, etc.).

Figure 3A:
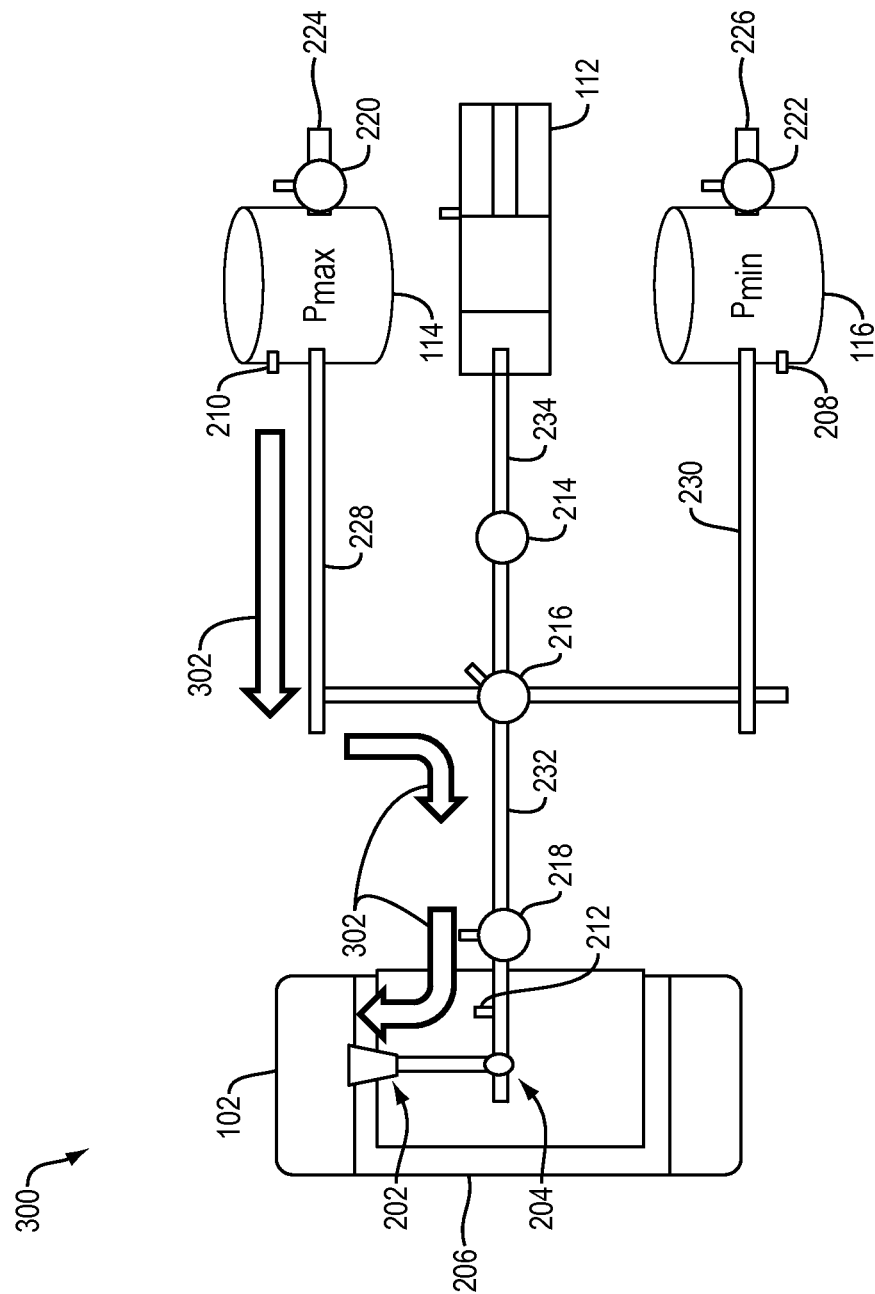
FIGS. 3A-3C are example illustrations of a tire pressure being adjusted using a D-TAPS.
Figure 3B:
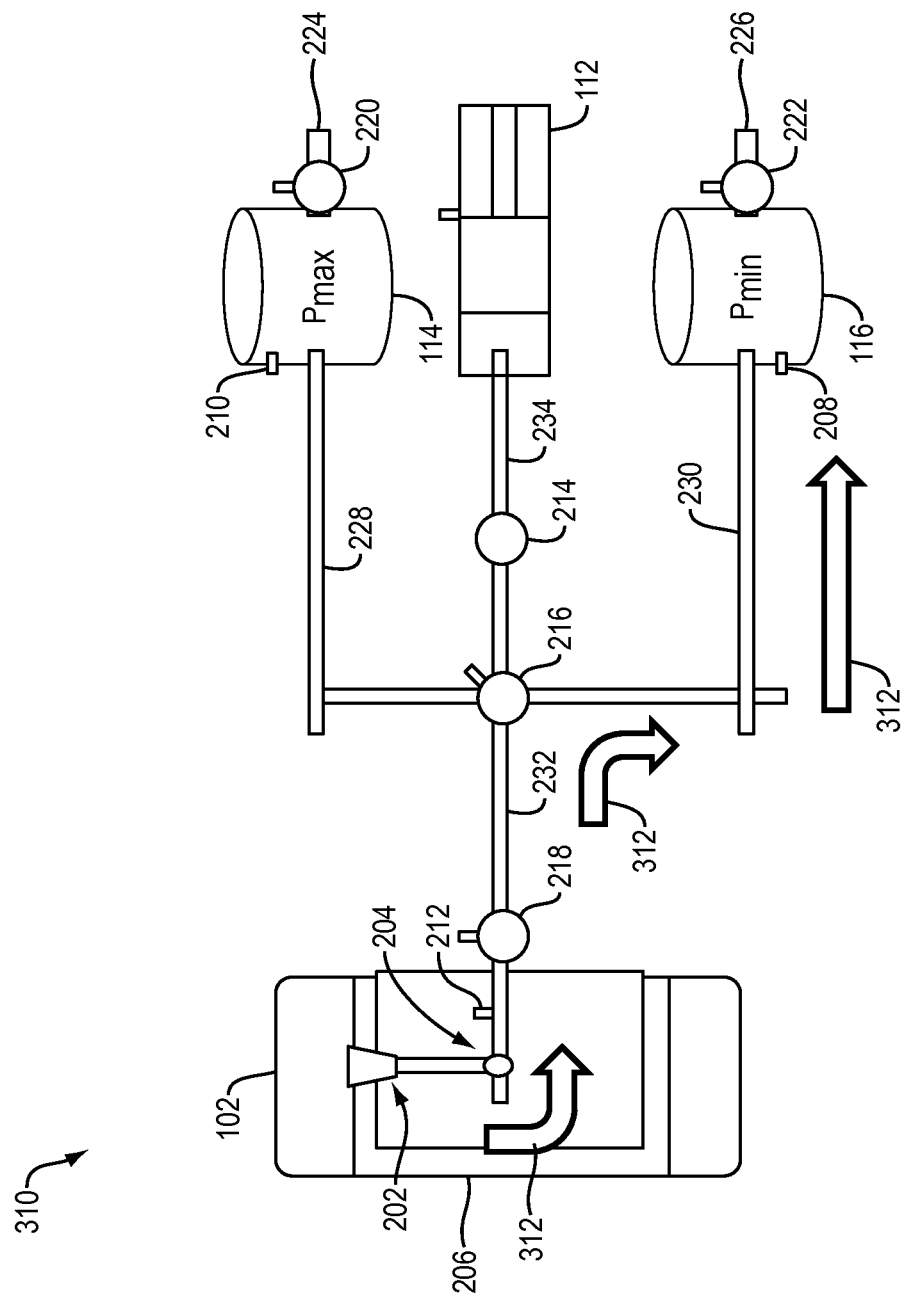
Figure 3C:
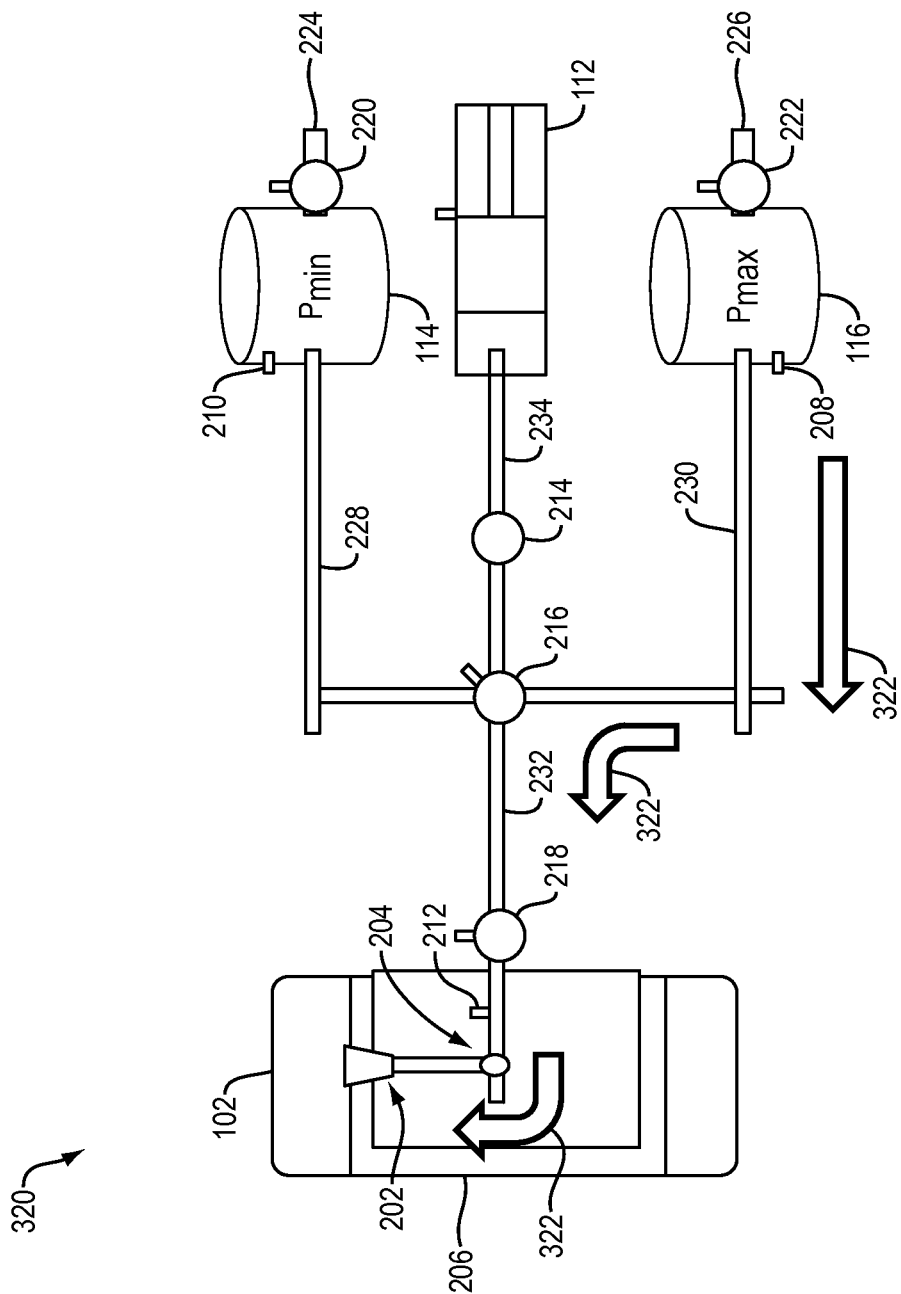

Various examples of the operation of system 200 to adjust the tire pressure of tire 102 are shown in FIGS. 3A-3C. In some embodiments, the pressures in tanks 114, 116 may be varied between a maximum pressure ($P_{max}$) and a minimum pressure ($P_{min}$) by control of switch 216. At maximum, the pressure within either of tanks 114, 116 is greater than or equal to that of the internal pressure of tire 102. Conversely, at minimum, the pressure within either of tanks 114, 116 is less than or equal to that of the internal pressure of tire 102. For example, at minimum, either of tanks 114, 116 may have an internal pressure equal to the atmospheric pressure or may even have a negative pressure due to applied suction.

In FIG. 3A, tire 102 is inflated by controller 110 using the stored pressure in tank 114. In response to determining that a vehicle state exists that warrants an increase to the internal pressure of tire 102, controller 110 actuates switch 216 to connect line 228 and tank 114 to line 232. Because of the increased pressure within tank 114, pressurized gas 302 thereby flows from tank 210 into lines 228 and 232. Similarly, controller 110 actuates valve 218 allowing pressurized gas 302 into tire 102 up to the maximum tire pressure. When the pressure in tire 102 is at a minimum pressure, controller 110 may close valve 218 and open vent 224 by actuating valve 220, thereby venting the remaining pressure in tank 114.

In FIG. 3B, tire 102 is deflated by controller 110 using tank 116. In response to determining that a vehicle condition exists that warrants a decrease to the internal pressure of tire 102, controller 110 actuates switch 216 to connect lines 232 and 230 and valve 218 to open line 212 to line 232. Because tire 102 has a higher internal pressure than that of tank 116, excess gas 312 is diverted away from tire 102 into tank 116 and may be captured there for later use. When the pressure in tire 102 reaches a minimum pressure (e.g., a threshold or setpoint pressure), controller 110 may actuate valve 218 and switch 216 to bring the pressure in tank 116 up to a maximum pressure for the next cycle of operation. Advantageously, by diverting gas from tire 102 to tank 116, compressor 112 will not need to work as long to fill tank 116 up to the maximum pressure.

In FIG. 3C, tire 102 is again inflated by controller 110, this time using tank 116 as the supplying tank. Switch 216 and valve 218 are again actuated to provide pressurized gas 322 to tire 102 from tank 116, which is at a maximum pressure. At this point, tank 114 is also ready to divert gas away from tire 102 if necessary, since tank 114 is at a lower pressure than that of tire 102 (e.g., atmospheric pressure, vacuum pressure via compressor 112, etc.). During operation, tanks 114, 116 may alternate as the inflating or deflating tank for each inflation/deflation cycle.

Figure 4:
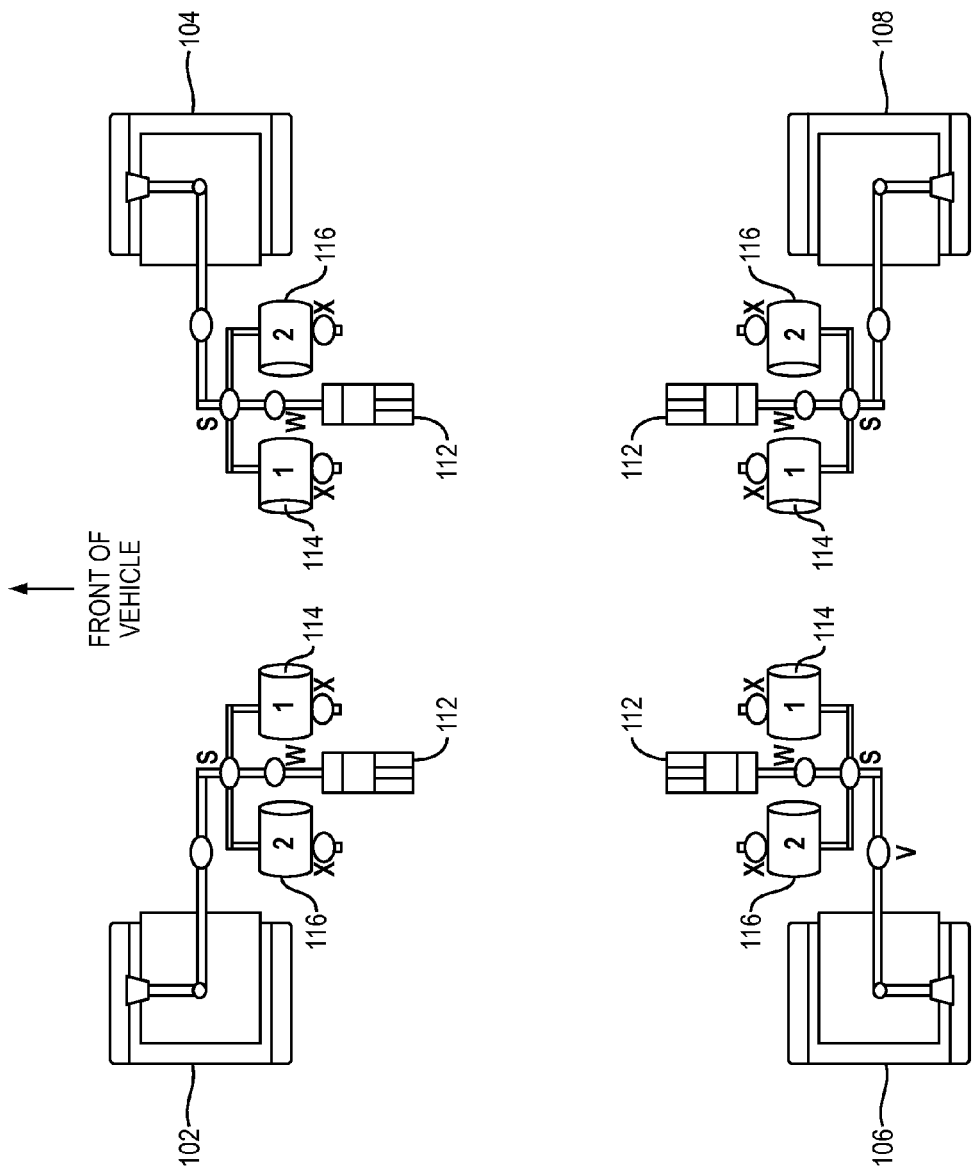
FIG. 4 illustrates an example of each tire of a vehicle having a separate D-TAPS.
Figure 5:
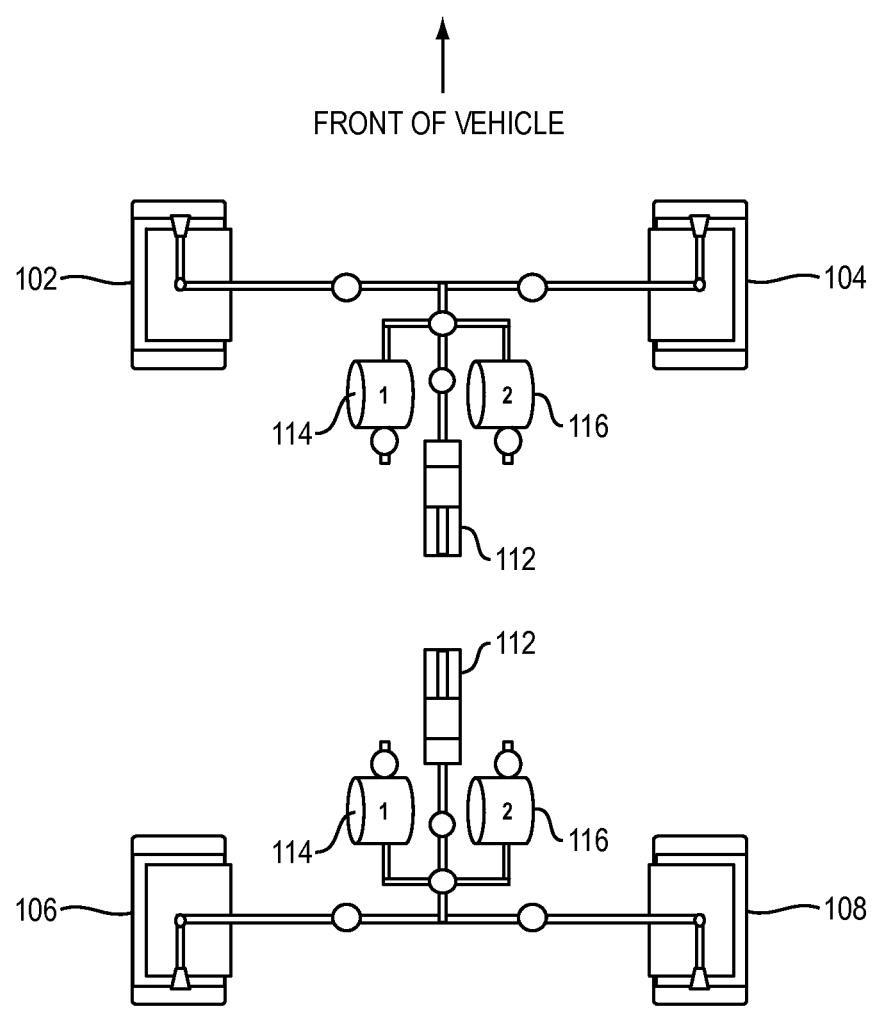
FIG. 5 illustrates an example of the front and rear tires of a vehicle each sharing a D-TAPS.
Figure 6:
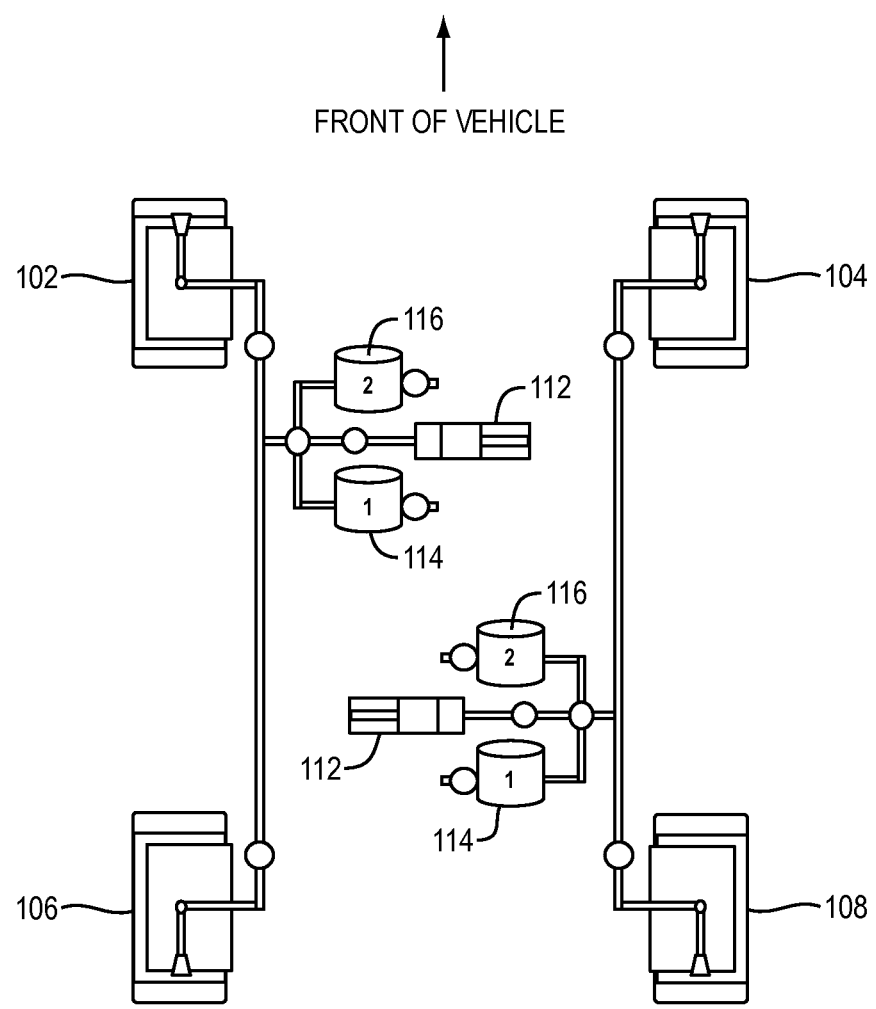
FIG. 6 illustrates an example of the left and right tires of a vehicle each sharing a D-TAPS.

Referring now to FIGS. 4-6, various configurations for D-TAPS are shown, according to some embodiments. As shown in FIG. 4, each of tires 102-108 may be connected to its own individual D-TAPS. As shown in FIG. 5, the front tires 102-104 of a vehicle may share a first D-TAPS and the rear tires 106-108 may share a second D-TAPS. As shown in FIG. 6, the left side tires 102, 106 may share a first D-TAPS and the right side tires 104, 108 may share a second D-TAPS. As will be appreciated, a D-TAPS system may be shared by any number of tires of the vehicle or may be employed on a one-to-one basis with each individual tire.

In cases in which more than one D-TAPS system is employed on a vehicle, a single controller (e.g., controller 110) may be used to control the operation of each D-TAPS, in one embodiment. For example, in a configuration similar to that shown in FIG. 5, a single controller may coordinate the inflation and deflation of any of tires 102-108 by controlling each of the D-TAPS. In another embodiment, each D-TAPS may have its own individual controller that controls the D-TAPS independent of any other D-TAPS. In a further embodiment, each D-TAPS may have its own slave controller that relies on a supervisory controller to coordinate operations across the different D-TAPS.

As detailed above, the controller of a D-TAPS may adjust the internal pressure of a tire based on a state of the vehicle. A simplified listing of various vehicle states and example tire pressure targets are listed below in Table 1:

TABLE 1

| Vehicle State & Tire Pressure | Comment |
|---|---|
| Highway Driving 30-60 psi (415 kPa) | Reduce rolling resistance and increase fuel efficiency New tire development required for continuous high pressure capability |
| City Driving 20-40 psi (275 kPa) | Combination of good fuel economy, comfort, and handling City driving tire pressure can be speed dependent |
| ABS/Emergency Braking 10-40 psi (138 kPa) | Rapidly decrease tire pressure when ABS is engaged to increase surface area between the tire and the road to maximize traction |
| Cornering Reduce by 2-20 psi (–70 kPa) | Reduce tire pressure of left hand or right hand tires when cornering at high speeds for better handling, amount depending on G-force and speed (sporty feel without sport tires) |

As shown in Table 1, various target tire pressures may be used depending on the current condition of the vehicle. For example, fuel economy may be increased during highway driving by maintaining a higher tire pressure than for city driving (e.g., at lower vehicle speeds). In another example, a lower tire pressure may be used during a braking condition, such as when an antilock brake system has been activated, to increase the footprint of the tire and decrease stopping distances.

Table 2 illustrates example decisions and actions that may be taken by a DTAPS controller when inflating a tire:

TABLE 2

| Decision | Condition | Event | Sport | Comfort | Eco |
|---|---|---|---|---|---|
| Recent Vehicle On? | Yes | Inflate to Nominal | Inflate tires to nominal pressure setting (28-36 psi) | | |
| Y-Axis Acceleration (Cornering)? | $Y < -\alpha$ | LH turn | Inflate outside tires, and deflate inside tires | | |
| | | | 2-6 psi | 4-8 psi | 2-6 psi |
| | $Y > \alpha$ | RH turn | Inflate outside tires, and deflate inside tires | | |
| | | | 2-6 psi | 4-8 psi | 2-6 psi |
| At Maximum Fuel Economy? | Yes | Maintain Current Pressure | Do not make any changes to the tire pressure | | |
| | No | Moderate Rate Increase, dependent upon acceleration rate | Inflate all tires | | |
| | | | 1-4 psi | 1-4 psi | 4-8 psi |

As shown above in Table 2, the amount of inflation provided to a tire may be a function of the current tire pressure, the state of the vehicle, and/or a specified user mode. For example, if the vehicle is cornering, the amount of inflation provided to the outside tires may be varied depending on whether the user mode is set for a more sporty feel, passenger comfort, or increased fuel economy.

Table 3 illustrates example decisions and actions that may be taken by a DTAPS controller when deflating a tire:

TABLE 3

| Decision | Condition | Event | Sport | Comfort | Eco |
|---|---|---|---|---|---|
| Security Enabled? | Yes | Deflate Completely | Deflate tires completely to prevent theft | | |
| Recent Vehicle On? | Yes | Deflate to Nominal | Deflate tires to nominal pressure setting (28-36 psi) | | |
| Traction Loss - ABS Active? | Yes | Rapid Deflate to minimum | Deflate all tires as fast as possible to the ABS tire pressure setting (maximum road-tire contact surface area) | | |
| Traction Loss- ESC Active? | Yes | Proceed to Cornering Decision | | | |
| Traction Loss - Cornering? | Yes | Traction Loss while Cornering | Moderately deflate inside tires to enhance grip | | |
| Traction Loss - Cornering? | No | Traction Loss while Not Cornering | Reduce tire pressure to enhance traction. | | |
| Y-Axis Acceleration (Cornering)? | $Y < -\alpha$ | LH turn | Deflate inside tire pressure to accommodate LH turn | | |
| | $Y > \alpha$ | RH turn | Deflate inside tire pressure to accommodate RH turn | | |
| | $-\alpha < Y < \alpha$ | Slow deflation to only the tires that need it, but 3 = 4 | Deflate pressure to tires that are slipping, but if 3 are slipping, deflate all tires in anticipation that the last tire will soon slip | | |
| Z-Axis Acceleration (Ride Comfort) | ≥A# in B Time | Slow deflation of all tires | Deflate all tires by 1-3 psi | Deflate all tires by 2-6 psi | Deflate all tires by 1-3 psi |

As shown above in Table 3, additional conditions that may trigger deflation of a tire include enabling a security feature (e.g., either automatically or manually by a user), detection of traction loss (e.g., activation of the vehicle's antilock brake system (ABS), etc.), slipping tires while cornering, and detected z-axis acceleration (e.g., along a direction substantially perpendicular to the surface of the ground). For example, the tires of the vehicle may be deflated automatically whenever the vehicle has been turned off, automatically in response to detecting a potential theft of the vehicle (e.g., a thief attempts to "hotwire" the vehicle), or in response to a user manually requesting that the tires be deflated for security reasons. Similar to the actions shown in FIG. 2, the amount of pressure adjustment may also be a function of any user settings that are set.

As will be appreciated, the amount of pressure added or removed from a given tire may be varied from those listed in Table 2, according to various other embodiments. In addition, whether or not a tire is inflated or deflated may vary from the events shown above in Tables 1-3. For example, when cornering, a particular set of tires may be inflated instead of deflated, or vice-versa, according to the techniques herein. In addition, when cornering, the amount of inflation or deflation of the front and rear tires along a given side of the vehicle may be varied.

Figure 7:
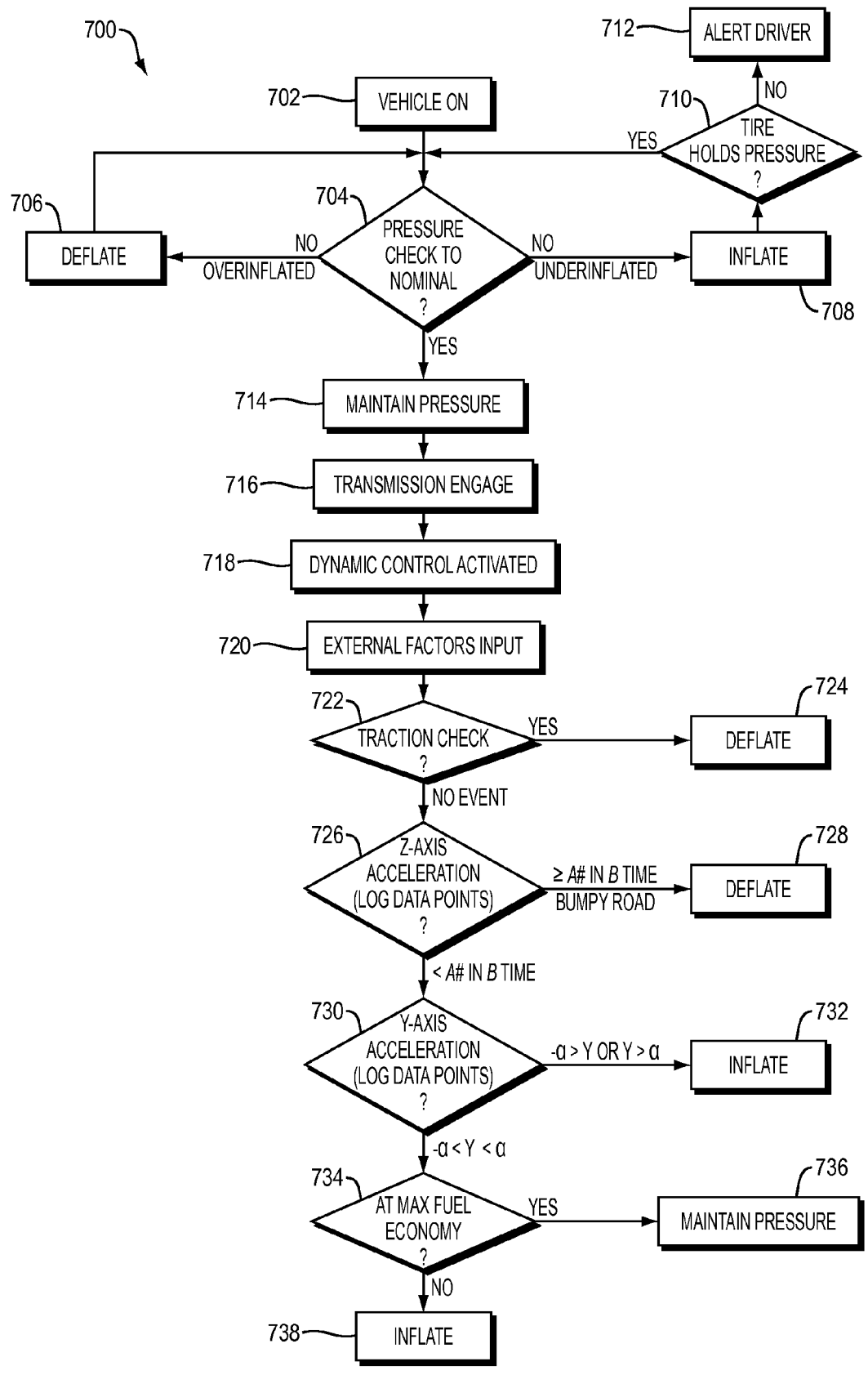
FIG. 7 is an example simplified procedure for adjusting a tire pressure.

Referring now to FIG. 7, an example simplified procedure is shown for adjusting a tire pressure is shown, in accordance with various embodiments. Procedure 700 begins at step 702 where the vehicle is first started and proceeds to decision step 704 where a measured tire pressure is compared to a normal/default range. For example, as shown above, the measured pressure of a tire may be compared to the range of 28-36 psi. As will be appreciated, different normal/default ranges may be used to accommodate different types of vehicles, tires, etc. If the tire pressure is below the default range, procedure 700 continues on to step 708 where the tire is inflated automatically. In some cases, procedure 700 then continues on to decision step 710 at which the tire pressure is tested to ensure that the tire is not losing pressure. If so, procedure 700 continues on to step 712 where an alert is provided to the driver (e.g., via an illuminated dash light, etc.). If, at step 704, the tire pressure is greater than the normal/default range, procedure 700 may continue on to step 706 where the tire is deflated. Steps 704,706 and/or steps 704, 708, 710 may be repeated any number of times in procedure 700 until the tire pressure is within the normal/default pressure range.

At step 714, the normal/default tire pressure is maintained while the vehicle itself is stationary. At step 716, the transmission is engaged (e.g., signifying that the driver is about to drive the vehicle by taking the vehicle out of park) and procedure 700 continues on to step 718. At steps 718-720, dynamic pressure control is activated to begin dynamically adjusting the tire pressure of the vehicle based on the state of the vehicle (step 718), as indicated by external factors received by the D-TAPS controller (step 720). As described in greater detail above, example inputs may include data regarding the ambient weather (e.g., temperature, humidity, precipitation, etc.), navigation data (e.g., to predict upcoming corners), user modes (e.g., sport, comfort, fuel economy, etc.).

At step 722, the traction of the vehicle's tires may be analyzed to determine whether a loss of traction is occurring. For example, as detailed above, the D-TAPS controller may determine that the vehicle is losing traction in response to receiving an indication that the vehicle's ABS or forward collision warning system has been activated. In such a case, procedure 700 continues on to step 724 at which the tire(s) are deflated to a setpoint braking pressure. Otherwise, procedure 700 continues on to step 726.

At step 726, another decision is made as to whether or not the vehicle is accelerating in the z-axis (e.g., a direction substantially perpendicular to the road). Such a condition may occur if the road itself is bumpy or the vehicle is traveling over other uneven terrain. In one embodiment, z-axis acceleration may be monitored using a laser scanner installed on the vehicle to measure and predict the immediate future road condition and adjust the tire pressure accordingly. In one embodiment, the D-TAPS controller may determine whether the z-axis acceleration is greater than or equal to a threshold amount within a threshold amount of time (e.g., $\geq \#A$ in B time). If so, procedure 700 continues on to step 728 where the tire(s) are deflated by a particular amount. In some embodiments, the amount of deflation may be based on a user mode, if set. For example, if the user has specified a user mode that maximizes passenger comfort, the tire may be deflated by a greater amount than if the user had specified a user mode that maximizes fuel economy. If a z-axis acceleration event is not detected in step 726, procedure 700 continues on to step 730.

At step 730, a decision is made as to whether or not the vehicle is cornering. Such a decision may be based on whether or not the y-axis acceleration (e.g., an axis extending through the driver and passenger side doors) is greater than or less than a threshold amount (e.g., $-\alpha > Y$ or $Y > \alpha$). These comparisons may indicate whether the vehicle is turning left or right. If the vehicle is determined to be cornering, procedure 700 continues on to step 732 where the outside tires (e.g., those tires opposite the turning direction) are inflated. In one embodiment, the inside tires may be deflated at step 732 in addition to, or in lieu of, inflating the outside tires. If a cornering state is not detected in step 730, procedure 700 continues on to step 734.

At step 734, the estimated fuel economy of the vehicle is compared to a target fuel economy value. If the fuel economy is at the target value, procedure 700 continues on to step 736 at which the current tire pressure is maintained. However, if the fuel economy is lower than the target, procedure 700 continues on to step 738 where the tire pressure is increased if necessary.

According to some embodiments, procedure 700 may return to step 720 after any of steps 724, 728, 732, 736, or 738. Thus, the system may provide continuous and dynamic tire pressure adjustment during driving. If the vehicle is put into park, procedure 700 may return to step 704, in one embodiment. Likewise, if the vehicle is turned off and later restarted, procedure 700 may begin again at step 702.

Figure 8:
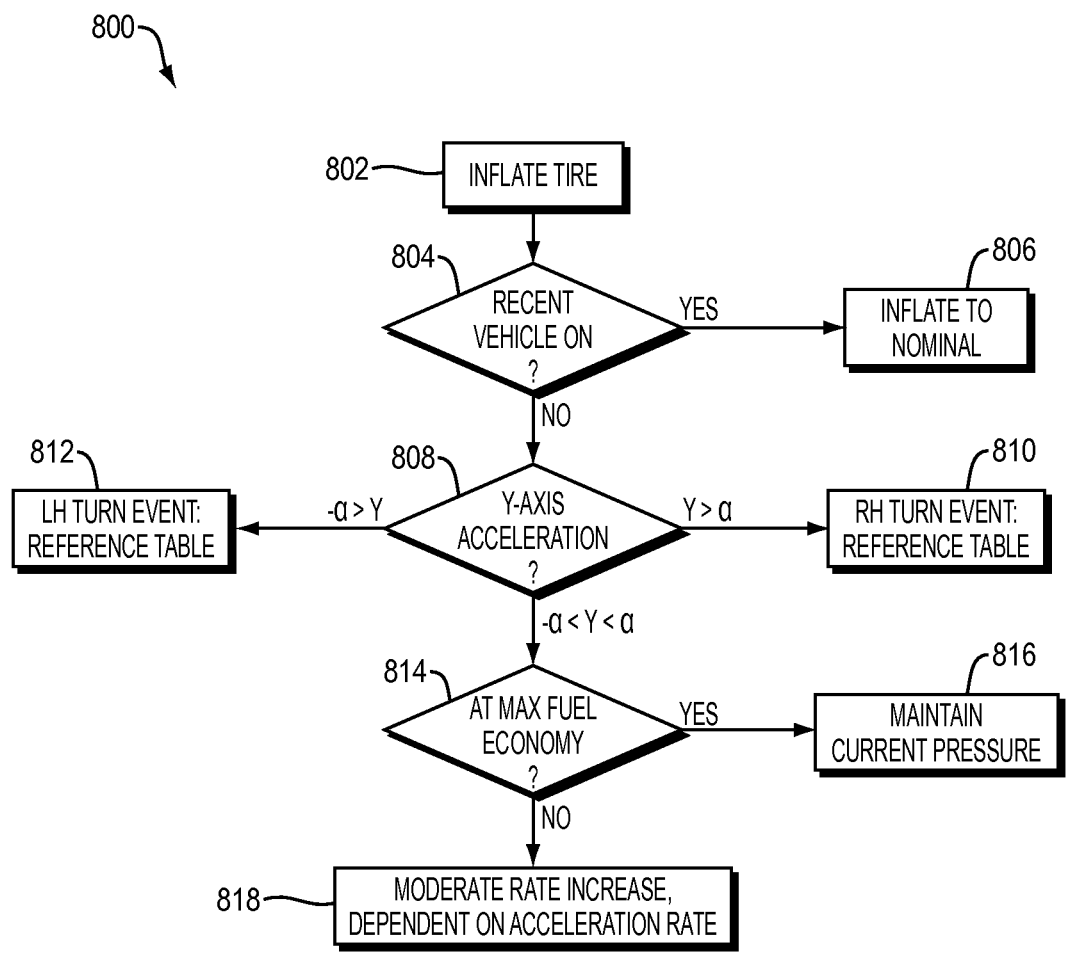
FIG. 8 is an example simplified procedure for increasing a tire pressure.

Referring now to FIG. 8, an example simplified procedure is shown for increasing a tire pressure is shown, in accordance with various embodiments. Procedure 800 begins at step 802 where it is determined that the pressure of a tire is to be increased. For example, in some embodiments, step 802 may correspond to any of steps 708, 732, or 738 shown in FIG. 7, based on the current tire pressure and the state of the vehicle. Procedure 800 then continues on to decision step 804.

At step 804, it is determined whether the vehicle was recently started. This may be determined by comparing the start time of the vehicle to a threshold amount of time (e.g., started within the past n-number of seconds or minutes) or in response to an indication that the vehicle was started. If so, procedure 800 continues on to step 806 where the tire pressure is increased to a default/normal amount. If not, procedure 800 continues on to step 808.

At step 808, a decision is made as to whether the vehicle is making a left hand (LH) turn or a right hand (RH) turn based on the y-axis acceleration of the vehicle. If a RH turn event is detected, procedure 800 continues on to step 810 where the outside tires (i.e., those along the left side of the vehicle) are inflated by an amount specified in a reference table. Such a table may, for example, include different pressure values for different user modes. Similarly, if a LH turn event is detected procedure 800 continues on to step 812 where the outside tires (i.e., those along the right side of the vehicle) are inflated by an amount specified in a reference table, which may include different values for different user modes. Otherwise, procedure 800 continues on to step 814.

At step 814, a decision is made as to whether or not the estimated fuel economy of the vehicle is achieving a target value. If it is, procedure 800 continues on to step 816 where the current tire pressure is maintained. However, if the estimated fuel economy is below the target, procedure 800 continues on to step 818 where the tire pressure is increased if possible. In one embodiment, the tire pressure is increased by a specific amount based on the set user mode. In another embodiment, the tire pressure is increased to a target value or by a particular amount.

Figure 9:
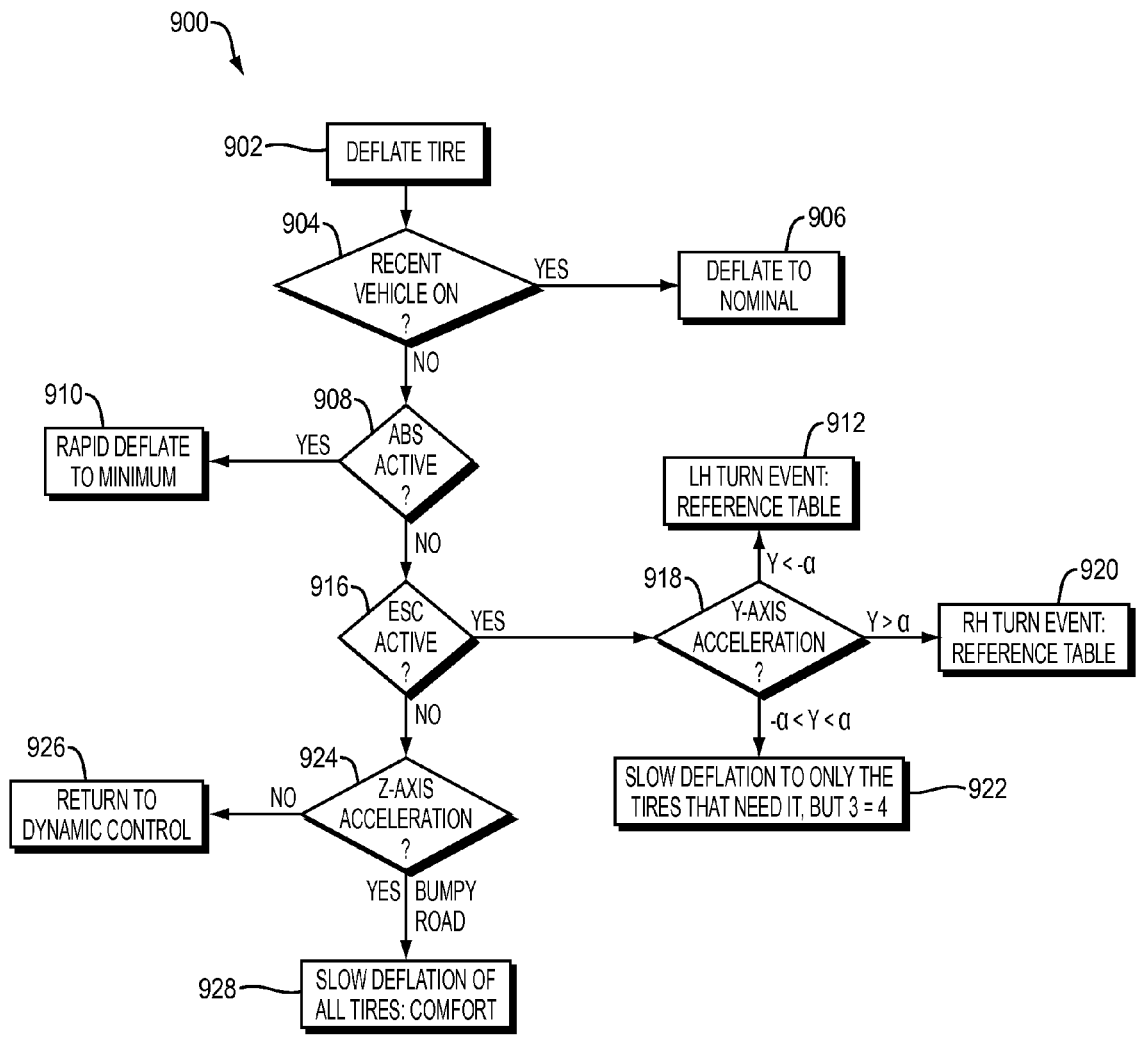
FIG. 9 is an example simplified procedure for decreasing a tire pressure.

Referring now to FIG. 9, an example simplified procedure is shown for decreasing a tire pressure is shown, in accordance with various embodiments. Procedure 900 begins at step 902 where it is determined that the tire pressure is to be decreased. For example, in some embodiments, step 902 may correspond to any of steps 706, 724, 728, or 732 shown in FIG. 7. Procedure 900 then continues on to step 904.

At step 904, a decision is made as to whether the vehicle was recently started. If the vehicle has been started recently, procedure continues on to step 906 at which the tire pressure is decreased until it reaches a default/normal pressure range. If the vehicle has not been started recently, procedure 900 continues on to step 908.

At step 908, a decision is made as to whether the ABS of the vehicle has been activated, indicating a loss of traction condition. If so, procedure continues on to step 910 where the tire pressure is decreased to a minimum braking pressure. Thus, the surface area of the tire making contact with the road is increased, which decreases the stopping distance of the vehicle. If the ABS is not active, procedure 900 continues on to step 916.

At step 916, a decision is made as to whether the electronic stability control (ESC) of the vehicle has been activated. If so, procedure continues on to step 900 to step 918 where a decision is made as to whether the vehicle is taking a left hand turn, a right hand turn, or is experiencing a loss of traction at one or more wheels. If a left hand turn is being made, procedure 900 continues on to step 912, where the tire pressure of the inside tires are decreased by a particular amount. Similarly, if a right hand turn is being made, procedure 900 continues on to step 920, where the tire pressure of the inside tires are decreased by a particular amount. If one or more of the tires are determined to be experiencing a loss of traction, procedure 900 continues on to step 922 where those tires are deflated by a certain amount. If the ESC is not active, procedure 900 continues on to step 924.

At step 924, a decision is made as to whether z-axis acceleration is detected in the vehicle. If so, procedure 900 continues on to step 928 where the tire pressure is decreased by a particular amount. For example, if the vehicle is traversing a bumpy road, the tire pressure may be decreased by 1-3 psi. In some embodiments, the amount of pressure decrease may be based on the selected user mode. If z-axis acceleration is not detected, procedure 900 proceeds to step 926 where processing may return to step 718 of procedure 700, as shown in FIG. 7.

It should be noted that some or all of the steps of procedures 700-900 may be optional and that the steps depicted in FIGS. 7-9 are merely examples. Certain other steps may be included or excluded from procedures 700-900 as desired, according to the teachings herein. Further, while a particular ordering of steps is shown in FIGS. 700-900, this ordering is merely illustrative and any suitable arrangement of the steps may be utilized without departing from the scope of the embodiments herein.

Advantageously, the techniques described herein provide a number of benefits over existing tire pressure systems. First, fuel economy may be optimized by ensuring that the tire pressure is always at an optimum pressure and fuel efficiency is also increased. Second, owner satisfaction is increased since a consumer will never need to manually fill the tires. Third, the safety of the vehicle is improved since the stopping distance during activation of the vehicle's ABS or forward collision warning system is reduced. Fourth, the handling/cornering of the vehicle is improved since higher g-force corners without tire slip are possible. Fifth, ride comfort is enhanced since softer tires are used when needed. Sixth, the appearance of the vehicle may be enhanced, since the valve stems described above are internal valve stems. Seventh, the performance of the vehicle is enhanced, since the vehicle can still operate with a slow leak and the tires may always be inflated with nitrogen for less pressure loss. Eighth, the vehicle security can be enhanced by configuring the system to deflate all tires as an anti-theft measure. Ninth, additional equipment enhancements may be used in conjunction with a D-TAPS, such as the use of vibration mitigating equipment such as engine mounts, shocks, struts, airbags, body mounts, and the like.

While the embodiment of the present disclosure has been described in detail, the scope of the right of the present disclosure is not limited to the above-described embodiment, and various modifications and improved forms by those skilled in the art who use the basic concept of the present disclosure defined in the appended claims also belong to the scope of the right of the present disclosure.

What is claimed is:

1. A dynamic tire air pressure system for a vehicle comprising:
   a tire pressure sensor that measures an air pressure of a tire;
   a first reservoir tank maintaining a lower air pressure than the measured air pressure of the tire;
   a second reservoir tank maintaining a higher air pressure than the measured air pressure of the tire; and
   one or more valves that control deflation and inflation of the tire by selectively coupling the tire to the first or second reservoir tanks.

2. The tire air pressure system as in claim 1, wherein first and second reservoir tanks are coupled to each tire of the vehicle.

3. The tire air pressure system as in claim 1, wherein the two reservoir tanks are coupled to tires located along the same side of the vehicle.

4. The tire air pressure system of claim 1, further comprising:
   an air compressor coupled to the first reservoir tank, the second reservoir tank, and the one or more valves, wherein the higher air pressure maintained by the second reservoir tank is provided to the second reservoir tank by the air compressor.

5. The tire air pressure system of claim 4, wherein the air compressor further comprises a nitrogen filter.

6. The tire air pressure system of claim 4, further comprising a controller that includes:
   one or more interfaces to communicate with the pressure sensor and the one or more valves;
   a processor coupled to the one or more interfaces and configured to execute one or more processes; and
   a memory configured to store a process executable by the processor, the process when executed operable to:
   actuate the one or more valves to inflate or deflate the tire based in part on the measured air pressure from the tire pressure sensor and a state of the vehicle by connecting either the first or second reservoir tank to the tire.

7. The tire air pressure system of claim 6, wherein the process when executed is operable to:
control the air compressor and the one or more valves to increase the pressure of the first reservoir tank if the tire is inflated by the second reservoir tank; and
control the air compressor and the one or more valves to decrease the pressure of the second reservoir tank if the tire is deflated by the first reservoir tank.

8. The tire air pressure system as in claim 6, wherein the process when executed is operable to:
determine that the state of the vehicle corresponds to the vehicle having started recently and, in response,
actuate the one or more valves to inflate or deflate the tire to a baseline air pressure.

9. The tire air pressure system as in claim 6, wherein the process when executed is operable to:
determine that the state of the vehicle corresponds to the vehicle accelerating in a direction substantially perpendicular to a ground surface and, in response,
actuate the one or more valves to deflate the tire by a particular amount of pressure.

10. The tire air pressure system as in claim 6, wherein the process when executed is operable to:
determine whether the vehicle is in a user mode selected from the group comprising: a sport mode, a comfort mode, and a fuel economy mode; and
wherein the tire is inflated by an amount of pressure that corresponds to the user mode.

11. A method of dynamically controlling tire air pressure in a vehicle comprising:
receiving, at a processor, an air pressure measurement from a tire pressure sensor;
increasing the internal pressure of a first reservoir tank to be higher than the measured pressure of the tire;
decreasing the internal pressure of a second reservoir tank to be lower than the measured pressure of the tire; and
actuating one or more valves to either deflate the tire by connecting the second reservoir tank to the tire or inflate the tire by connecting the first reservoir tank to the tire.

12. The method as in claim 11, further comprising:
decreasing the internal pressure of the first reservoir tank when the tire is deflated by the second reservoir tank; and
increasing the internal pressure of the second reservoir tank when the tire is inflated by the first reservoir tank.

13. The method as in claim 11, further comprising:
using the first and second reservoir tanks to inflate or deflate every tire of the vehicle.

14. The method as in claim 11, further comprising:
using the first and second reservoir tanks to inflate or deflate a plurality of tires located along a same side of the vehicle.

15. The method of claim 11, further comprising:
determining that a state of the vehicle corresponds to the vehicle having started recently and, in response,
actuating the one or more valves to inflate or deflate the tire to a baseline air pressure.

16. The method as in claim 11, further comprising:
determining that a state of the vehicle corresponds to the vehicle accelerating in a direction substantially perpendicular to a ground surface and, in response,
actuating the one or more valves to deflate the tire by a particular amount of pressure.

17. The method as in claim 11, further comprising:
determining whether the vehicle is in a user mode selected from the group comprising: a sport mode, a comfort mode, and a fuel economy mode; and
inflating or deflating the tire by an amount of pressure that corresponds to the user mode.

18. The method as in claim 11, further comprising:
determining that the vehicle is in a security mode and, in response,
deflating the tire to a minimum pressure.

19. The method as in claim 11, further comprising:
filtering gas provided to one of the reservoir tanks.

* * * * *